Patented Mar. 7, 1933

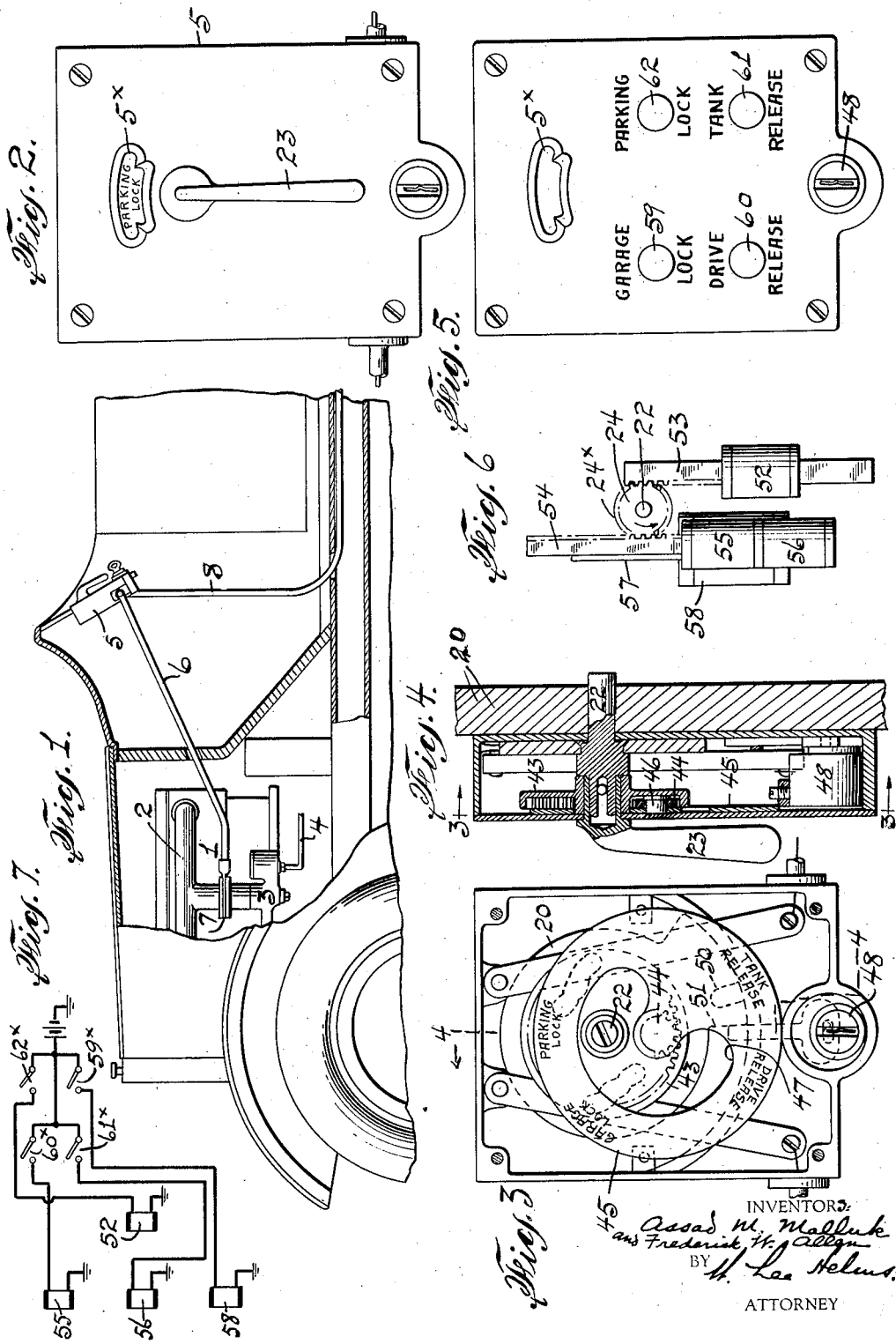

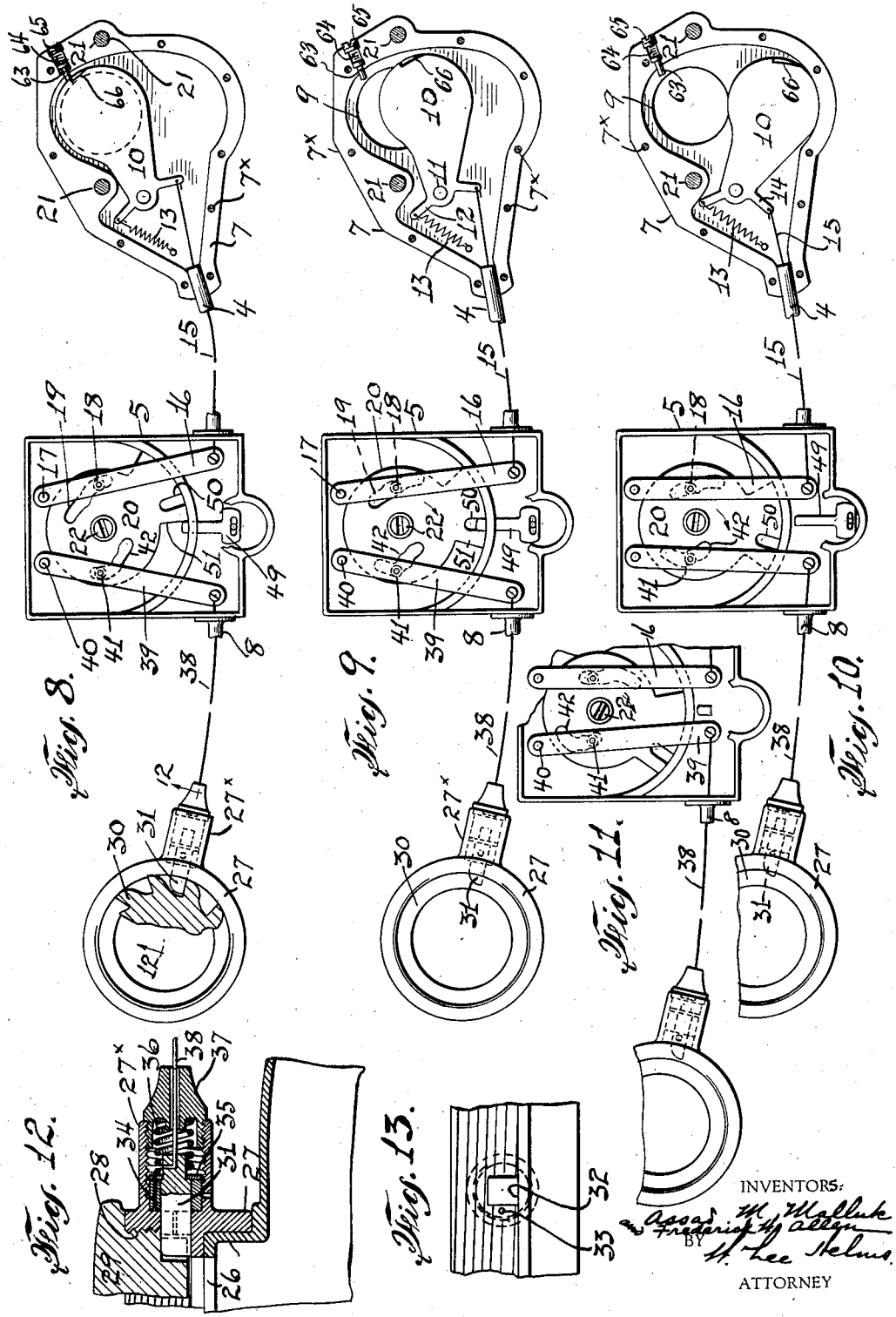

1,900,245

UNITED STATES PATENT OFFICE

ASSAD M. MALLUK, OF NEW YORK, AND FREDERICK W. ALLEN, OF SEA CLIFF, NEW YORK

FUEL CONTROL APPARATUS FOR AUTOMOBILES

Application filed October 29, 1931. Serial No. 571,820.

The object of the present invention is to provide fuel control means for automobiles comprising a control means adapted to be mounted on the dash board of an automobile and having operable connection with members connected to the automobile engine and to the fuel tank whereby the flow of raw fuel to the carburetor of the engine may be controlled, the flow of fuel mixture from the carburetor to the engine may be controlled, the opening of the fuel tank cap may be controlled, and the flow of fuel may be so regulated when the car is placed in a garage that the engine may be operated for a limited time while the gas tank is locked and the flow of the fuel from the tank to the carburetor via the customary vacuum tank or pump is prevented in order to forestall any unauthorized use of the car or removal of fuel from the tank. These and further objects of the invention will be brought out in detail hereinafter.

The invention will be described with reference to the accompanying drawings which show an embodiment of the invention, it being understood that various modifications may be made therein without departing from the spirit of the invention.

Fig. 1 is a fragmentary sectional elevation of an automobile schematically showing certain elements of the device.

Fig. 2 is a view in front elevation of the manual control box.

Fig. 3 is a view in elevation of the control box with the cover removed, on the line 3—3, Fig. 4.

Fig. 4 is a vertical section on the line 4—4, Fig. 3.

Fig. 5 is a view in front elevation of the electrical control box, constituting a modification.

Fig. 6 is a view in elevation of the magnetic operating elements for the operating cam of the device.

Fig. 7 is a schematic lay-out of the electrical control.

Fig. 8 is a plan view of the control box, the tank cap controlling mechanism and the intake manifold controlling mechanism, showing the latter in the "parking lock" position.

Fig. 9 is a view similar to Fig. 8 showing the parts in "garage lock" position.

Fig. 10 is a view similar to Figs. 8 and 9 showing the parts in "drive release" position.

Fig. 11 is a view similar to Fig. 8 but omitting the manifold control mechanism, with the exception of the lever and cable therefor, showing the parts in "tank release" position.

Fig. 12 is a sectional elevation on the line 12—12, Fig. 8.

Fig. 13 is a fragmentary view of the tank opening from the interior wall thereof, showing the position of the air inlet.

Referring to the drawings, Fig. 1 illustrates the forward portion of an automobile the engine being indicated at 1, the intake manifold at 2, the carburetor at 3, and the carburetor feed pipe at 4. The control box is indicated at 5. From the control box a conduit 6 leads to a shutter support 7 intermediate the carburetor and the manifold 2. A second conduit 8 leads from the control box to the rear of the chassis for connection to the fuel tank cap control means.

The shutter support is shown in detail in Figs. 8, 9, and 10. It comprises a shallow lower member having an opening 9 for the passage of fuel mixture from the carburetor to the intake manifold, the opening 9 being controlled by shutter 10 pivoted at 11 and having a short arm 12 engaged by a spring 13 which serves to normally hold the shutter in the position illustrated in Fig. 8 by shutting off the flow of the fuel mixture. The shutter is provided with a second arm 14 for engagement with a cable 15 leading through conduit 4 to a lever arm 16 within the control box 5, the lever arm being pivoted at 17.

Carried by lever arm 17 is a roller or stud 18 entering a cam slot 19 formed in a cam disk 20.

The shutter support is preferably provided with a cap (not shown), and when a cap is employed it will be formed with an opening in register with opening 9, and the cap may be secured in position by screws having threaded openings 7x. Screws or bolts shown in section at 21 may pass through the flange of the carburetor and the flange of the intake manifold for securing the shutter support, the carburetor and the manifold in assembled relation.

Cam 20 is fixed to a shaft 22 which carries an operating handle 23 when the device is to be manually operated, the operating handle being at the front of the control box 5. However, when the device is to be electrically operated, shaft 22 may have secured thereto at the rear of the box a pinion or pinions such as 24, 24x, Fig. 6, for engagement with operating members of the electrical mechanism.

The fuel tank is formed at 26 with an annular flange formed with an opening at and upon flange 26 may be mounted an annular collar 27 threaded at 28 to receive a threaded cap 29. The lower wall of the cap may be formed with rigid teeth 30, Fig. 8, for engagement with locking pawl 31 which passes through an opening 32 formed in the threaded collar (Fig. 13). Opening 32 is surrounded on the exterior of the annular collar by a tubular extension 27x preferably formed integrally with the collar. Adjacent opening 32 and within the tubular extension 27x is an air inlet 33 which is adapted to be closed by engagement with a washer 34 carried within said tubular extension 27x, the extension being internally threaded. Washer 34 is mounted upon locking pawl 31 and may be pinned to a metal washer 35 carried by the pawl on its reduced end, the metal washer being engaged by a spring 36 tending to move the pawl inwardly or toward locking position. The outer end of tubular extension 27x may be closed by threaded plug 37 apertured to receive a wire or cable 38 secured to the pawl and leading through conduit 8 to the control box.

Cable 38 is secured to a lever 39 pivoted at 40 in the box and having a stud or roller 41 entering a cam slot 42 formed in cam 20. Carried by shaft 22 in front of cam disk 20 is an internal gear 43 engaging a pinion 44 pivotally carried by indicia plate 45 through stud 46 (Fig. 4.) The indicia plate is cut away at 47 to enable a movement thereof around shaft 22 and the hub of internal gear 43.

Indicia plate 45 may bear the markings "Brake lock," "Garage lock" "Drive release" and "Tank release" in accordance with the several positions of the controlling mechanism and hence in accordance with the several positions of cam 20.

At the base of the control box may be placed a lock 48 adapted to actuate a locking bolt 49 to either enter a locking recess 50 formed in cam 20 or to engage a shoulder 51 of the cam.

In the operation of the device for manual control and assuming the automobile to be parked, on the street, for example, handle 23 is turned to bring the cam to the position illustrated in Fig. 8 and incidentally bringing indicia plate 45 to the position illustrated in Fig. 3 so that the words "Parking lock" will lie in register with the opening 5x formed in the front plate of the control box 5. Lock 48 may then be operated to throw bolt 49 against shoulder 51. It will be noted with reference to Fig. 8 that the cam slot 19 holds lever arm 16 in such position as to release tension upon cable 15 so that spring 13 will move shutter 10 over opening 9 and shut off the passage of fuel mixture to the manifold of the engine. Also cam slot 42 holds lever arm 39 in position to release tension upon cable 38 enabling spring 36 to hold pawl 31 in locking position and to carry washer 34 against air passage 33 so that the fuel cannot be pumped out of the fuel tank. In this position of the parts pawl 31 will engage the straight face of one of the teeth 30 so that the cap 29 cannot be unscrewed from collar 27.

When it is desired to drive the car, lock 48 may be operated to withdraw bolt 49 from shoulder 51 of the cam. Handle 23 may then be turned to the position illustrated in Fig. 10, whereupon indicia plate 45 will be brought to the position where the marking "Drive release" will come opposite opening 5x of the control box cover plate. In this position of the parts, the cam 20 has moved lever 16 inwardly causing cable 15 to pull upon arm 14 and move the shutter 10 to its open position. Cam 20 has also moved lever arm 39 inwardly a short distance causing a sufficient movement of cable 38 to carry washer 34 away from the air inlet 33 while retaining the end of the pawl in engagement with one of the teeth 30. In other words, the cap cannot be removed but the vacuum tank or pump may operate to carry fuel from the fuel tank. If it is desired to add fuel to the fuel tank, lever arm 23 is turned until the words "Tank release" on the end plate are brought in register with the opening 5x of the control box cover plate, whereupon the parts will lie in the position shown in Fig. 11. In this movement of the cam plate, the position of lever arm 16 has not been changed from that illustrated in Fig. 10, but lever arm 39 has been given an inlet movement to carry pawl 31 out of engagement with the toothed cap so that the cap may be removed.

When the car is placed in a garage it is usually required that the engine be left in running condition so that the car may be moved under its power, as, for example, in case of fire. The present invention enables the locking of the car so far as any substantial running of the motor, whilst enabling emergency operation of the motor. To this end, lever 23 may be turned to bring the wording of the indicia plate "Garage lock" opposite opening 5x of the control box cover plate, whereupon the parts will be brought to the position illustrated in Fig. 9. In such position lever arm 16 has been moved to carry shutter 10 partly out of register with opening 9 while pawl 31 of the fuel tank control lies in such position that washer 34 is pressed by spring 36 against air inlet 33 of collar 27. In such position of the parts, the fuel remaining in the vacuum tank and carburetor or in the carburetor and pump when a pump is employed in lieu of a vacuum tank, will be sufficiently to enable emergency operation of the engine, but no fuel can be drawn from the tank, neither can cap 29 be removed in the garage.

In the electrical control, handle 23 may be eliminated and pinions 24, 25 of shaft 22 may be connected to solenoid rack cores. For example, three solenoids may be employed, one with a double winding. For convenience of illustration, the double wound solenoid is replaced in the wiring diagram, Fig. 7, by two separable solenoids. In the position of the solenoids shown in Fig. 6, solenoid 52 is provided with a core in the form of a rack bar 53, the teeth of the bar being in mesh with pinion 24 on the shaft 22. Pinion 24 also is in mesh with the teeth of a rack core 54 of a double wound solenoid comprising solenoid section 55 and solenoid section 56. Rearwardly of pinion 24 is a second pinion 24x in mesh with the rack core 57 of the solenoid 58.

In the position of the parts illustrated in Fig. 6, it may be assumed that shaft 22 and cam 20 lie in the position shown in Fig. 8 which is the "Brake lock" position with the fuel entirely shut off. By pressing the "Drive release" button 59, Fig. 5, switch 59x Fig. 7, will be momentarily closed thus energizing solenoid 58 and causing rack bar 52 to act upon pinion 24x turning shaft 22 and cam 20 from the position shown in Fig. 8 to the position shown in Fig. 9 which is the "Garage lock" position. In other words, solenoid 58 imparts a short throw to rack core 57. By pressing button 60, the momentary closing of switch 60x will be effected energizing solenoid section 55 and moving rack core 54 sufficient to carry cam 20 from the position of Fig. 9 to the position of Fig. 10. By pushing button 61, switch 61x is momentarily closed energizing solenoid section 56 and moving cam 20 from the position illustrated in Fig. 10 to that of Fig. 11. During these movements of pinion 24, rack bar 53 has been carried upwardly into active position so that when button 62 is pressed, switch 62x will be momentarily closed, thus energizing solenoid 52, causing rack bar 53 to reverse the movement of shaft 22 and cam 20 to carry the cam from the position illustrated in Fig. 11 to the position illustrated in Fig. 8. Thus the parking control solenoid mechanism acts in position to the "Garage lock", "Drive release" and "Tank release" mechanism and in whatever position the cam may be from that illustrated in Fig. 8 pushing "Brake lock" button 62 will bring the cam back to "Brake lock" position of Fig. 8. The "Drive release" switch may be keyed with the "Garage lock" so that if the parts are in the position of Fig. 8, pressure upon the "Drive release" button will also throw the "garage lock" switch in operation to carry the parts successively from the position illustrated in Fig. 8 to that of Fig. 9 and Fig. 10, and the "Tank release" may be keyed with the "Drive release" and "Garage lock" so that pressure upon the "Tank release" button will cause contact of the three switches from the "Parking lock" position to the "Tank release" position if such action is required.

By reference to Figs. 8, 9 and 10, it will be noted that within the shutter casing is a stud 63 pressed inwardly by a spring 64, the spring engaging a screw plug 65. Should wire 15 be severed, for example, by a thief, spring 13 will swing shutter 10 into such position that stud 63 will enter a recess cut into the margin of the shutter at 66 the stud moving opposite a shoulder of the recess so that the shutter will be locked in closed position. A similar spring pressed stud may be employed to enter a recess formed in the locking pawl 31 for the filler cap should cable 38 be cut.

Having described our invention, what we claim and desire to secure by Letters Patent is as follows:—

1. Fuel controlling means for an automobile of a type including an internal combustion engine, an intake manifold and a fuel tank, comprising a control box adapted to be mounted on a dash board, a shutter adapted to be connected to the intake manifold and a locking device adapted to be connected to the fuel tank for locking the cap thereof, and means connected to the control box for moving both the shutter and the tank cap locking means to three positions.

2. In fuel controlling means for automobiles, means for controlling both passage of fuel from the fuel tank and the passage of fuel to the intake manifold of the engine comprising a closure at the fuel tank inlet, a closure intermediate the engine carburetor and the intake manifold, an operating device for the manifold closure, a locking device for the fuel tank closure, and a rotatable member within the control box and adapted, upon a movement thereof in one direction, to simultaneously actuate said operating device and said locking device.

3. Fuel controlling means for automobiles, comprising a casing adapted to be supported intermediate the engine carburetor and the intake manifold, a shutter in said casing, a fuel tank provided with a filler cap and an air inlet passage, a member adapted to lock the filler cap and control air inlet passage, a control box, and means connected to the control box adapted to actuate the shutter and the filler cap locking member and to hold the shutter in position to afford restricted communication between the carburetor and the intake manifold whilst holding the filler cap locking member in position to close said air inlet passage.

4. Fuel controlling means for automobiles, comprising a casing adapted to be supported intermediate the engine carburetor and the intake manifold, a shutter in said casing, a fuel tank provided with a filler cap and an air inlet passage, a member adapted to lock the filler cap and control said air inlet passage, a control box, and means connected to the control box adapted to actuate the shutter and the filler cap locking member to hold the shutter in position to afford unrestricted communication between the carburetor and the intake manifold whilst holding the filler cap locking member in position to open said air inlet passage whilst locking the filler cap.

5. Fuel controlling means for automobiles comprising a casing adapted to be supported intermediate the engine carburetor and the intake manifold, a shutter in said casing, a fuel tank provided with a filler cap and an air inlet passage, a member adapted to lock the filler cap and control said air inlet passage, a control box, and means connected to the control box adapted to actuate both the shutter and the filler cap locking member.

6. Fuel controlling means for automobiles, comprising a casing adapted to be supported intermediate the engine carburetor and the intake manifold, a shutter in said casing, a fuel tank provided with a filler cap, a member adapted to lock the fuel cap, a control box, levers within the control box and connected to the shutter and to the filler cap locking member and a rotatable member within the control box adapted, upon rotation, to actuate said levers simultaneously and to actuate one lever independently of the second lever.

7. Fuel controlling means for automobiles comprising a shutter for the intake manifold, a fuel tank provided with a filler cap, a member adapted to lock the filler cap, a control box and a rotatable member within the control box adapted to actuate the shutter and the locking member in unison and also adapted to actuate one independently of the other.

8. Fuel controlling means for automobiles, comprising a shutter for the intake manifold, a fuel tank provided with a filler cap, a member adapted to lock the filler cap, a control box, a cam within the control box having connections with the shutter and the filler cap locking member and electrical means for rotating said cam.

9. Fuel controlling means for automobiles, comprising a shutter for the intake manifold, a fuel tank provided with a filler cap, a member adapted to lock the filler cap, a control box, a cam within the control box having connections with the shutter and the filler cap locking member, and a plurality of solenoids operatively connected with the cam in combination with switch devices for selectively energizing said solenoids.

10. Fuel controlling means for automobiles, comprising a shutter for the intake manifold, a fuel tank provided with a filler cap and an air inlet passage, a control box having means for actuating the shutter, a member adapted to lock the filler cap and provided with means for closing said air inlet passage and connections intermediate said last-named members in the control box adapted to open the air inlet passage whilst maintaining the cap locked.

11. Fuel controlling means for automobiles comprising a shutter for the engine intake manifold, a fuel tank provided with a filler cap, a control box provided with means for actuating said shutter, means for locking the filler cap comprising a casing mounted on the fuel tank, a pawl movable through a wall of the casing, a spring engaging the pawl, an air inlet passage through the wall of the casing adjacent the pawl and normally permitting the passage of air to the interior of the tank, means carried by the pawl and adapted to close said air inlet passage and connections intermediate the control box and the pawl for actuating the latter.

12. Fuel controlling means for automobiles comprising a fuel tank having a filler cap provided with a locking element, an endwise movable pawl adapted to engage said locking element, an air inlet for the fuel tank and means carried by the pawl for closing said air inlet when the pawl is in locking position, and a control box having means connected with the pawl for actuating the same.

13. Fuel controlling means for automobiles comprising a shutter for the intake manifold, a fuel tank provided with a filler cap, a member adapted to lock the filler cap, a control box having means for actuating the shutter through rotation of a shaft, and an indicia disk having operative connection with said shaft whereby the disk is rotated to a degree greater than the shaft when the latter is rotated.

14. Fuel controlling means for automobiles comprising a shutter for the intake manifold, a fuel tank provided with a filler cap, a member adapted to lock the filler cap, and a control box having means for actuating the shutter and the cap locking member, said means comprising a pair of levers and a rotary cam member operatively connected to said levers and a shaft carrying the cam member and adapted to be rotated to actuate the latter, the cam member being adapted to actuate said levers in unison and to actuate one lever whilst the second lever is held in fixed position.

15. Fuel controlling means for automobiles comprising a shutter for the intake manifold, a fuel tank provided with a filler cap, a member adapted to lock the filler cap, and a control box having means for actuating the shutter and for indicating the position of the actuating means and comprising flexible connections leading from the shutter and the filler cap locking member to the control box, levers connected to said flexible connections, a rotary cam adapted to actuate the levers and an indicia disk adapted to be rotated by the cam at a greater peripheral speed than the cam.

In testimony whereof, we have signed our names to this specification.

ASSAD M. MALLUK.
FREDERICK WM. ALLEN.